May 22, 1951 J. T. NEISWINTER 2,553,978

ELECTRONIC CONTROL TELEGRAPH REPEATER FOR HUB CIRCUIT OPERATION IN TELEGRAPH SERVICE BOARDS

Filed May 2, 1950 2 Sheets-Sheet 1

INVENTOR
J. T. NEISWINTER
BY H. A. Patterson
ATTORNEY

May 22, 1951 J. T. NEISWINTER 2,553,978

ELECTRONIC CONTROL TELEGRAPH REPEATER FOR HUB CIRCUIT OPERATION IN TELEGRAPH SERVICE BOARDS

Filed May 2, 1950 2 Sheets-Sheet 2

INVENTOR
J. T. NEISWINTER

BY H. A. Patterson

ATTORNEY

Patented May 22, 1951 2,553,978

UNITED STATES PATENT OFFICE 2,553,978

ELECTRONIC CONTROL TELEGRAPH REPEATER FOR HUB CIRCUIT OPERATION IN TELEGRAPH SERVICE BOARDS

James Trapp Neiswinter, New York, N. Y., assignor to American Telephone and Telegraph Company, a corporation of New York Application May 2, 1950, Serial No. 159,557

12 Claims. (Cl. 178—73)

This invention relates to telegraph systems and particularly to line repeaters individual to a plurality of lines connected for hub circuit operation to a common regenerative repeater which upon receiving signals from any one of such line repeaters, regenerates and repeats the received signals to the other lines through their respective line repeaters simultaneously.

It is an object of the invention to control the operation of the individual line repeaters by means of electron discharge devices whereby greater speed and better quality of telegraph repeater transmission is had.

It is a further object of the invention to reduce the number of electron discharge devices required in the control circuit of each of the individual line repeaters to a minimum without affecting the speed or the quality of telegraph transmission.

Heretofore telegraph line repeaters arranged for hub type of operation employed in their control circuits electromagnetic relays which are relatively slow in operation and because of their mechanical and electrical inertia may tend to introduce distortion.

According to the present invention the control circuit of each of a plurality of telegraph line repeaters, which are interconnected for hub circuit operation, employs certain discharge devices instead of electromagnetic relays for controlling the retransmission of signal impulses incoming over one of the interconnected lines to the other of such lines. Two only of such electron discharge devices are required in each line repeater, one device being responsive to signals incoming over its respective line circuit to control the other of the two devices whereby the signals after being regenerated are repeated over each of the other interconnected line circuits only. In the event that signals are received from two or more of the interconnected line circuits simultaneously, space signals are repeated over all the interconnected line circuits, and therefore the home records of the signals simultaneously transmitted over their respective line circuits are mutilated at the signal originating points of such respective line circuits.

A feature of the invention is the provision of two electron discharge devices only in the control circuit of each line repeater.

Another feature is the provision of a direct connection of the receiving conductor of one line repeater to the sending conductor of another line repeater and the receiving conductor of such other repeater to the sending conductor of the first-mentioned repeater whereby the operation of each of the repeaters in response to signals from the receiving conductor of the other repeater is on a one-way polar basis.

Still another feature is the provision of means for using the cathode current of an electron discharge tube for operating, or driving, the send relay of each of the line repeaters.

Still another feature is the provision of a condenser shunt to ground in the plate circuit of each of the send relay driving electronic tubes for correcting the wave form of the cathode current flowing through the windings of the associated send relay whereby the square-topped form of the mark-to-space transitions is retained in a positive manner.

Another feature is the provision in the receive conductor of each line repeater, of a rectifying varistor for isolating the source of negative voltage at the line receive relay from the receive hub to which the receive conductors of the line repeaters are connected in parallel.

Another feature is the provision of means for holding the electronic tube for driving the send relay of each line repeater in a non-conducting condition at all times except when signal impulses are being received by any one of the other of the line repeaters associated therewith for hub operation.

Another feature is the provision of a shunt fed voltage for biasing in a marking direction the send relay of each line repeater when the send relay driving electronic tube is in a non-conducting condition.

Another feature is the provision of a twin-triode electron discharge device in each line repeater arranged for flip-flop operation and means for maintaining such device in one condition during the time when the signals are being received from its associated line circuit and in the other condition when the signals are being received from any one of the other associated lines.

Another feature is the provision of means for causing to be conducting the send relay driving electronic tube of a line repeater and for applying to the grid on such tube a positive voltage from the send hub, under the control of the twin-triode electron discharge device that is arranged for flip-flop operation.

Another feature is the provision in the control circuit of each of the line repeaters arranged for hub operation of two electronic devices for maintaining the send relay of the repeater in a steady marking condition while its receive relay only is receiving incoming signals.

Another feature is the provision of means for connecting the grid associated with the cathode of the driving, or operating, circuit of the send relay to a holding, or locking, circuit in the other electronic discharge device of its line repeater.

Another feature is the provision of double-space by-pass means automatically operative in response to two or more space voltages simultaneously impressed on the receive hub when the receive relays of two or more line repeaters operate to their respective spacing positions whereby the send relays of such repeaters are not locked in their marking positions when their respectively associated receive relays are responding to signals incoming over their line circuits simultaneously.

Another feature is the provision of means for applying the regenerated signals on the send hub directly to the grid associated with the cathode of the driving, or operating, circuit of the send relay of each line repeater.

Another feature is the provision of means for controlling the locking circuit at one point by the receive relay associated with the control circuit and at another point by the receive hub.

Other objects and features of the invention will appear from a study of the following specification, claims and appended drawings of which:

Fig. 1 shows in schematic form a plurality of telegraph lines each equipped with a telegraph repeater connected to a single one-way regenerative repeater arranged to serve the telegraph lines on a hub circuit basis. In Fig. 1 each of the telegraph line repeaters is provided with a control circuit having two electronic devices of the twin-triode type, one arranged for flip-flop operation and serving to condition the repeater and the other serving to operate, or drive, the send relay of the repeater; and Fig. 2 is another embodiment of the arrangement shown in Fig. 1 in which the control circuit comprises two electronic devices one being of the twin-triode type for conditioning the repeater and the other a pentode which serves to operate or drive the send relay of the repeater.

GENERAL DESCRIPTION OF FIG. 1

Referring to Fig. 1 telegraph lines $A_1$, $B_1$ and $C_1$ are representative of a larger number of lines connected through their respective line repeaters such as $LRA_1$, $LRB_1$ and $LRC_1$ to an electronic regenerative repeater $RR_1$ of a type such as disclosed in the patent application of B. Ostendorf, Serial No. 77,169, filed February 18, 1949, or W. T. Rea et al. Patent 2,454,084, issued November 16, 1948. The disclosure of either this Rea et al. patent or this Ostendorf application is hereby made a part of the present application as if fully set forth herein. All sources of potential shown in the drawing are assumed to be of positive 130 volts or negative 130 volts as indicated, except where otherwise specified. The corresponding elements of the balanced line repeaters $LRA_1$, $LRB_1$ and $LRC_1$ are distinguished from each other by alphabetical suffixes A or *a*, B or *b*, or C or *c*, etc., and each of these suffixes has an added subscript numeral 1 to indicate that it is a part of Fig. 1. The corresponding resistors of the line repeaters are designated with reference characters of identical alphabetical letters A, B and C of the upper case and to each of which is added a letter such as *a*, *b*, or *c* of the lower case to indicate the line repeater of which it forms a part. Each of the lower case letters of the resistor reference characters has a subscript numeral 1 to indicate that the resistor is located in Fig. 1.

The resistors in each line repeater of Fig. 1 are assumed to have the following resistance values: A equals 6,000 ohms, B equals 17,000 ohms, C equals 20,000 ohms, D equals 10,000 ohms, E equals 2 megohms, F equals 4 megohms, G equals 0.15 megohm, J equals 2 megohms, K equals 1 megohm, L equals 0.15 megohm, M equals 1 megohm, N equals 1 megohm, P equals 2 megohms, Q is of a relatively low resistance value serving merely to regulate the positive voltage applied to the plate of the send relay driving, or right-hand, triode section of the driving twin-triode device such as device $DA_1$ of line repeater $LRA_1$ and R equals 20,000 ohms.

The balanced line repeaters are identical and a description of one should suffice for a description of the others. Line repeater $LRA_1$ will now be described for the purpose of illustration. Subscriber line $A_1$ comprises receive leg $RLa_1$ connected to the winding of receive relay $RA_1$ and send leg $SLa_1$ connected to the armature of send relay $SA_1$. Relays $RA_1$ and $SA_1$ are of the polar type and are normally positioned in the marking, or right-hand, positions. Receive relay $RA_1$ is normally controlled by current flowing in receive leg $RLa_1$ and when the receive leg of the line $A_1$ is opened, receive relay $RA_1$ is operated to its spacing, or left-hand, contact by the biasing current flowing in the lower winding of the relay. Send relay $SA_1$ normally has a 6-milliampere current flowing in a marking direction through both its windings, in series, as will be hereinafter described.

Receive relay $RA_1$ receives signals incoming over line $A_1$ and repeats them, attenuated, over a receive hub $RH_1$ to the input circuit of electronic regenerative repeater $RR_1$ wherein they are regenerated to the shape in which they were originally transmitted and then retransmitted over the output circuit of the regenerative repeater and send hub $SH_1$ to the other lines $B_1$, $C_1$, etc., simultaneously. Receive hub $RH_1$ and send hub $SH_1$ are common to all the balanced line repeaters of the hub system.

Line repeater $LRA_1$ includes in addition to receive relay $RA_1$ and send relay $SA_1$, a rectifying varistor $VA_1$ for permitting the flow of current in a spacing direction only, that is, current flowing from the space, or left-hand, contact and armature of receive relay $RA_1$, over receive conductor $RCA_1$, receive hub $RH_1$, to potentiometer P—1, a conditioning twin-triode electron discharge device $CA_1$, a twin triode electron discharge device $DA_1$ jointly controlled by the output of regenerative repeater $RR_1$ and conditioning device $CA_1$, condenser $XA_1$ for reducing the reaction of the inductive effect of current surges in the windings of send relay $SA_1$, and a plurality of resistors for varying the potentials applied to the elements of both twin-triodes under different signal conditions.

Normally, receive relay $RA_1$ and send relay $SA_1$ are in their marking, or left-hand, positions wherein their armatures are respectively connected to negative voltage sources of 130 volts as shown. Receive relay $RA_1$, therefore, normally applies a negative voltage of 130 volts to one side of a unilateral electrical conducting element, referred to herein as rectifying varistor $VA_1$. The other side of rectifying varistor $VA_1$ is connected in a path extending over receive conductor $RCA_1$ of line repeater $LRA_1$, receive hub $RH_1$ and then, in parallel, to the input of regenerative repeater $RR_1$ and to a point on potentiometer P—1 between resistors $H_1$ and $I_1$, respectively assumed to have resistance values of 17,333 ohms and 7,700 ohms. The point of connection on potentiometer P—1 has a negative voltage of 40 volts. There are at this time negative potentials of different voltages on opposite sides of rectifying varistor $VA_1$, but this difference of potentials cannot cause a current to flow because the current flow tendency is in a direction opposite to the unilateral character of rectifying varistor $VA_1$. The positive voltages of 130 volts of the signal impulses repeated by receive relay $RA_1$ cause currents to flow through rectifying varistor $VA_1$ and these current impulses are impressed on the regenerative repeater which regenerates and repeats the incoming signals for transmission to send hub $SH_1$ and from there these regenerated signals are repeated by the send relay of each of the other line repeaters $LRB_1$, $LRC_1$, etc., to the line circuits respectively connected thereto.

The conditioning twin-triode electron discharge device $CA_1$ has right- and left-hand triode sections respectively designated $V1a_1$ and $V1b_1$. These two sections always assume opposite conditions, that is, when section $V1a_1$ is in a non-conducting condition, section $V1b_1$ is in a conducting condition, and vice versa. In this manner this conditioning device provides what is generally known as flip-flop operation. This conditioning device $CA_1$ can be at rest with the two sections $V1a_1$ and $V1b_1$ in either opposite conditions, but not in the same condition simultaneously. In other words, when receive relay $RA_1$ is in its marking position and the receive relays of the other line repeaters are also in their marking positions, the conditioning device can remain in either of its two positions, that is, with section $V1a_1$ in either its non-conducting or conducting condition and section $V1b_1$ in either its conducting or non-conducting condition, respectively.

When triode section $V1a_1$ is in a non-conducting condition, the voltage at its plate element is almost 130 volts and, for the purpose of this description, will be considered as being positive 130 volts. This positive voltage of 130 volts when applied through resistor $Ka_1$ combines with the negative 95 volts applied through resistor $Ja_1$, to produce at the grid of triode section $V1b_1$ a positive voltage of about 48 volts which causes triode section $V1b_1$ to conduct. When triode section $V1b_1$ is conducting the voltage at its plate is positive and has a value of about 20 volts, assuming that there is a potential difference of 20 volts between the plate and the filament of the triode section. The positive voltage of 20 volts at the plate of triode section $V1b_1$ through resistor $Fa_1$ combined with the negative voltage of 40 volts applied through resistance $Ea_1$ to produce a negative voltage of about 20 volts at the grid of triode section $V1a_1$, which enforces the non-conducting condition of triode section $V1a_1$ as hereinbefore assumed. The conditioning device $CA_1$ is, therefore, in condition of triode section $V1a_1$ being nonconducting and triode section $V1b_1$ being conducting.

When no signals are incoming over any of the line repeaters, assume triode section $V1a_1$ is placed in a conducting condition due to a momentary positive voltage being applied to the grid element of triode section $V1a_1$. The voltage at the plate element of section $V1a_1$ then becomes positive 24 volts. This positive voltage of 24 volts through resistor $Ka_1$ combines with the negative 95 volts through resistor $Ja_1$ to produce negative 22 volts at the grid of triode section $V1b_1$ and this negative voltage of 22 volts causes triode section $V1b_1$ to change from conducting to non-conducting. When triode section $V1b_1$ changes to a non-conducting condition the voltage at its plate element becomes positive and has a value of 130 volts. This positive voltage of 130 volts through resistor $Fa_1$ combines with the negative 40 volts applied through resistor $Ea_1$ to produce on the grid of triode section $V1a_1$ a positive voltage of 17 volts. Therefore, triode section $V1a_1$ will remain in a conducting condition even after the positive voltage momentarily applied to its grid element is removed, or until the start impulse of the first signal of an incoming message is received by the receive relay of another line repeater such as repeater $LRB_1$ or $LRC_1$, or one of the other line repeaters, not shown.

In the manner just described, it is shown that the conditioning device $CA_1$ can remain in either of two conditions when the receive relay of the control circuit of which it constitutes a part, is in the marking position and the receive relay of each of the other control circuits is also in its marking position. Therefore, when the conditioning device $CA_1$ is in one condition, that is, with triode section $V1a_1$ conducting, the voltage at the grid of triode section $V1b_1$ is negative 20 volts and $V1b_1$ is non-conducting, and when it is the other condition, that is, with triode section $V1a_1$ non-conducting, the voltage at the grid of triode section $V1b_1$ is positive 17 volts, and $V2b_1$ is conducting.

When the conditioning device $CA_1$ is in the condition of triode section $V1a_1$ being conducting the voltage at the grid of triode section $V2a_1$ of the driving device $DA_1$ is negative 53 volts. This results in triode section $V2a_1$ being non-conducting. When $V1b_1$ is in its conducting condition its grid voltage is positive 48 volts and when it is in its non-conducting condition its grid voltage is negative 22 volts.

When the conditioning device $CA_1$ is in the condition of triode section $V1a_1$ being non-conducting and triode section $V2a_1$ being conducting, a negative voltage of 24 volts from grounded battery permanently connected to the cathode of triode section $V2a_1$, is applied directly to the grid of the send relay driving triode section $V2b_1$. Therefore, triode section $V2b_1$ is held non-conducting to prevent any signals from the output of regenerative repeater $RR_1$ from being transmitted through the windings of send relay $SA_1$.

When triode section $V1a_1$ of conditioning device $CA_1$ is conducting and triode section $V2a_1$ is non-conducting, the negative voltage of 24 volts from the grounded battery permanently connected to cathode element of triode section $V2a_1$ is isolated from the grid element of triode section $V2b_1$. Triode section $V2b_1$ at this time conducts and the signals from the output of regenerative repeater $RR_1$ control triode section $V2b_1$ to drive send relay $SA_1$ which operates to repeat the regenerated signals to line $A_1$. Since, at this time, there is no blocking voltage, such as the negative 24 volts of the grounded battery connected to the cathode of triode section $V2a_1$, applied to the grid element of triode section $V2b_1$ of driving device $DA_1$, a spacing signal in the output of regenerative repeater $RR_1$ applies a positive voltage of 40 volts over send hub $SH_1$ to the grid element of triode section $V2b_1$ whereby section $V2b_1$ becomes conducting to cause a current of approximately 12 milliamperes to flow in a spacing direction through the windings, in series, of send relay SA. This spacing current of approximately 12 milliamperes dominates the marking current of 6 milliamperes hereinbefore mentioned as normally flowing through the relay windings, and send relay SA, therefore, operates to its spacing position to transmit the spacing signal out over send relay $SLa_1$ of line $A_1$.

In one condition, therefore, conditioning device $CA_1$ blocks the passage of regenerated signals to send relay $SA_1$ and in the other condition it does not block the passage of signals but permits them to be repeated by send relay $SA_1$. The receive relay $RA_1$, upon operating in response to signals incoming over receive leg $RLa_1$, causes conditioning device $CA_1$ to so position itself as to block the passage of signals to send relay $SA_1$, thus preventing the signals on the receive leg $RLa_1$ from being repeated to the point where the signals originated, and when signals are being received from the receive leg of another line circuit and repeated over a receive conductor such as conductor $RCB_1$ or $RCC_1$, the latter signals are permitted to operate send relay $SA_1$.

Normally, on the send side of each of the line repeaters the marking, or negative, voltage of 40 volts received from the output of regenerative repeater $RR_1$ and impressed on the send hub $SH_1$, holds triode section $V2b_1$ of each driving device $DA_1$, $DB_1$, $DC_1$, etc., non-conducting. The only current flowing at this time in the windings, in series, of each of the send relays $SA_1$, $SB_1$, $SC_1$, etc., is from the circuit traceable from the source of negative potential of 130 volts and the respective resistors $Ra_1$, $Rb_1$, $Rc_1$, etc. This current has a value of about 6 milliamperes and flows in a marking direction, as hereinbefore stated, whereby each of send relays $SA_1$, $SB_1$, $SC_1$, etc., is held in its marking position as shown. The circuit by including both windings, in series, of each of the send relays reduces to one half the current required to operate each of the send relays and makes it possible to use a smaller vacuum tube to operate the relay.

When the receive relay, such as relay $RA_1$, operates to its spacing position the voltage at the cathode of triode section $V1a_1$ becomes 42 volts positive and the voltage at the grid element becomes 33 volts positive, thus causing triode section $V1a_1$ to become non-conducting. At the same time the voltage at the grid of triode section $V1b_1$ becomes 97 volts positive, through the application to this grid of the positive 130 volts now at the plate of triode section $V1a_1$ of conditioning device $CA_1$ and the positive 40 volts applied through resistor $JA_1$, and triode section $V1b_1$ becomes conducting.

With the conditioning device $CA_1$ in the position of triode section $V1a_1$ being non-conducting, which blocks the output signals of regenerative repeater $RR_1$ from operating said relay $SA_1$ and, therefore, prevents the regenerated signals from being transmitted out over the send leg $SLa_1$, the conditioning device $CA_1$ will remain in this position after receive relay $RA_1$ returns to its marking position. Therefore, during the time when receive relay $RA_1$ is operating in response to signals incoming over receive leg $RLa_1$ of line $A_1$, the conditioning device will remain constantly in the position which locks triode section $V2b_1$ in a non-conducting condition.

After receive relay $RA_1$ has ceased to operate and has returned to its marking position at the end of a message, the voltage on the cathode of $V1a_1$ returns to about positive 4 volts. A space signal now received over the receive hub $RH_1$ from the receive relay of any other line repeater such as repeater $LRB_1$ or $LRC_1$ will cause the voltage at receive hub $RH_1$ to become positive 40 volts. This positive voltage of 40 volts applied through resistor $Ea_1$ to the grid element of triode section $V1a_1$ of conditioning device $CA_1$, combines with the positive voltage of 20 volts being applied through resistor $Fa_1$, to produce a positive voltage at the grid element of triode section $V1a_1$ of about 33 volts. This positive voltage of 33 volts causes triode section $V1a_1$ to become conducting and therefore removes the locking voltage from the grid element of triode section $V2b_1$ of driving device $DA_1$ so that signals from regenerative repeater $RR_1$ may operate said relay $SA_1$ to permit the transmission of the regenerated signals out over send conductor $SLa_1$ of line $A_1$.

The conduction of triode section $V1a_1$ and the non-conduction of triode section $V1b_1$ at this time will continue for the duration of the time that the signals are being received by conditioning device $CA_1$ from receive hub $RH_1$ and also after that time until receive relay $RA_1$ once again operates to its spacing position in response to signals incoming over receive conductor $RLa_1$ of line $A_1$.

DETAILED DESCRIPTION OF FIG. 1

*Receive relays of all line repeaters are in their respective marking positions*

Figure 1:
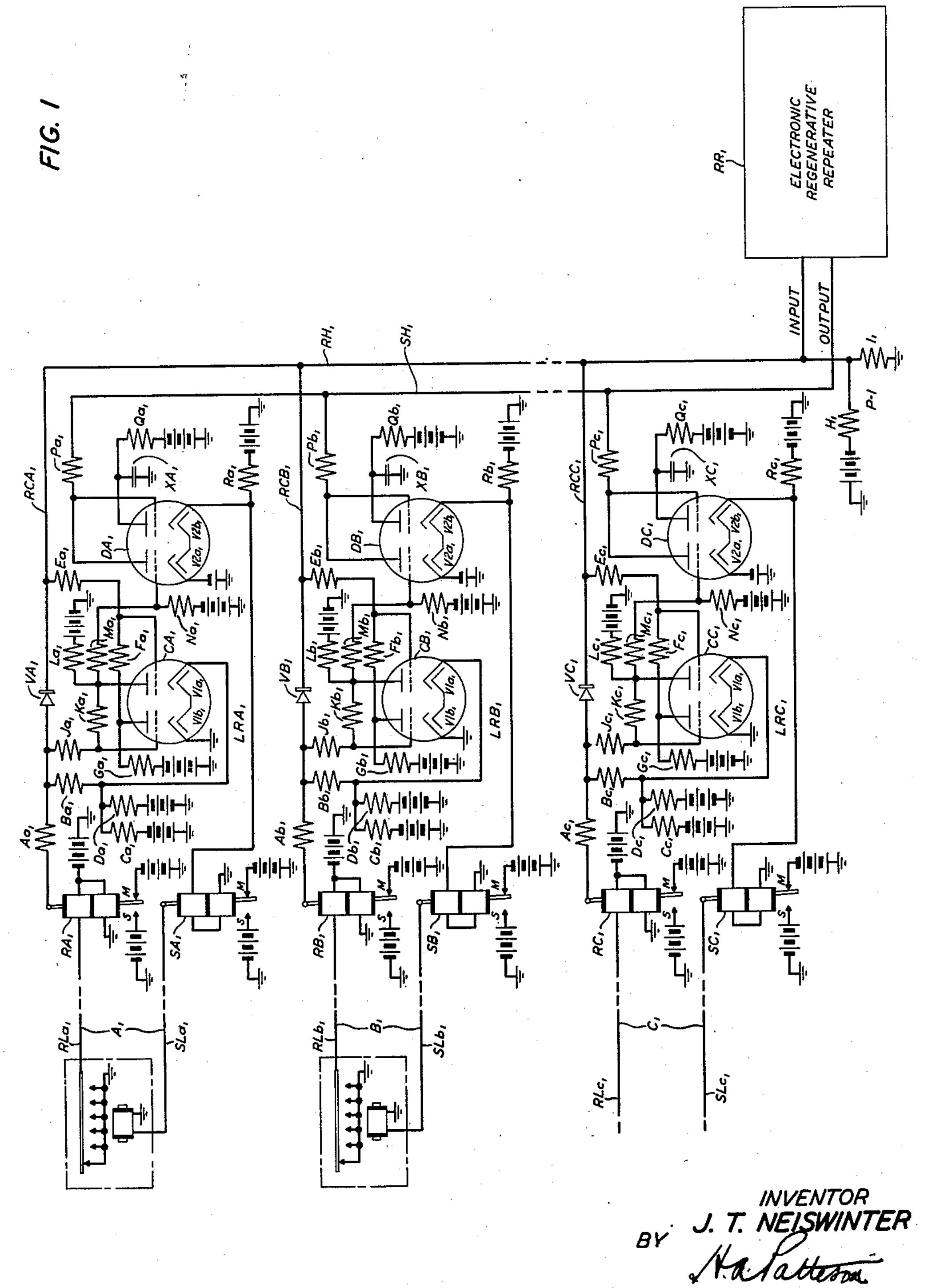

For the purpose of illustrating the method of operation of the arrangement shown in Fig. 1, it is assumed herein that the hub repeater system is in normal condition, in that no signals are being received over any of the line repeaters. The triode section $V1a_1$ of each of the line repeaters is in a non-conducting condition, although it may be, as hereinbefore stated, in a conducting condition inasmuch as it remains in the condition to which it was last operated. With the triode section $V1a_1$ in a non-conducting condition the voltage at the plate of triode section $V1a_1$ is positive 130 volts. Inasmuch as each receive relay, such as receive relay $RA_1$, is at this time in its marking position, a negative voltage of 130 volts at the marking, or left-hand, contact of relay $RA_1$ is connected at one end of the receive hub circuit and negative 40 volts at potentiometer P—1 is connected at the other end. Rectifying varistor $VA_1$ offers a higher resistance when this condition exists and therefore a negative 95 volts is applied through resistor $Ja_1$. This negative 95 volts combined with the positive 130 volts at the plate of triode section $V1a_1$, applied through resistor $Ka_1$, produces at the grid of triode section $V1b_1$ a voltage of positive 48 volts which cause triode section $V1b_1$ to conduct. With triode section $V1b_1$ conducting, and assuming that there is a voltage drop of 20 volts across the elements of triode section $V1b_1$, the voltage at its plate is about 20 volts positive. The positive voltage of 20 volts at the plate of triode section $V1b_1$ applied through $FA_1$ combined with the negative voltage of 40 volts applied through resistor $Ea_1$ produce a voltage of about 20 volts negative at the grid of triode section $V1a_1$ which enforces the non-conducting condition of triode section $V1a_1$ as hereinbefore described. Therefore conditioning device $CA_1$ is at this time, as hereinbefore assumed, in the condition of triode section $V1a_1$ being non-conducting and triode section $V1b_1$ being conducting.

The description of the conditioning device as hereinbefore given, is intended to show that with the receiving relay associated with the particular line repeater circuit, on its marking contact and all the receiving relays of the other line repeater circuits on their respective marking contacts, the conditioning device can remain in either of its two positions, there being different voltages applied to the grids of triode sections $V1a_1$ and $V1b_1$ for the two conditions. For example, when triode section $V1a_1$ is conducting, a positive voltage of 17 volts is applied to its grid and when non-conducting a negative voltage of 20 volts is applied to the grid; and when triode section $V1b_1$ is non-conducting, a negative voltage of 22 volts is applied to its grid and when conducting, a positive voltage of 48 volts is applied to the grid.

When the conditioning device is in the position of triode section $V1a_1$ being conducting, the voltage at the grid of triode section $V2a_1$ is negative 53 volts which results in triode section $V2a_1$ being non-conducting. With triode section $V2a_1$ being non-conducting, the negative 24 volts permanently impressed on its cathode is isolated from the grid of triode section $V2b_1$ so that triode section $V2b_1$ is at this time under the control only of the send hub voltage. When triode section $V2b_1$ is conducting under the control only of the send hub voltage, and since it is the driving means for its associated send relay, the signals from the output of the regenerative repeater $RR_1$ are able to control the triode section $V2b_1$, that is, pass through it, to operate its associated send relay for transmitting the regenerated signals to the outgoing line.

When the conditioning device is in the position of triode section $V1a_1$ being non-conducting, voltage at the grid of triode section $V2a_1$ is about zero value. With the voltage at the grid of triode section $V2a_1$ at zero value, triode section $V2a_1$ conducts, since its cathode is at negative 24 volts, and applies the blocking voltage of negative 24 volts permanently impressed on its cathode, directly to the grid of the triode section $V2b_1$. Triode section $V2b_1$ at this time assumes a steady non-conducting condition and prevents any signals from the output of the regenerative repeater $RR_1$ from passing to the associated send relay and this send relay can not transmit the regenerative signals.

In one condition the conditioning device blocks the passage of signals to the send leg of the line and in the other condition does not block the passage of signals thereto. The operation of the line repeater circuit, when its receive relay is operating, conditions the conditioning device so that the send leg of such line repeater is blocked, thus preventing the signals on the receive leg from returning on the associated send leg to the point of origin, and when signals are being received from another line repeater of the system the conditioning devices of those line repeaters which are not receiving incoming signals are conditioned so that their respective send legs are not blocked and signals are repeated over the send legs by their respective send relays.

*Receive relay of one only of the line repeaters operates to its spacing position*

When the receive relay of one of the repeaters, say relay $RA_1$ of repeater $LRA_1$, responds to signals incoming over its line, it operates to its spacing contact in response to the start impulse of the first signal. When this receive relay, that is, receive relay $RA_1$ operates to its spacing contact, it connects positive 130 volts in a circuit traceable over the left-hand, or spacing, contact and armature of relay $RA_1$, resistor $Aa_1$, resistor $Ba_1$ to the cathode of triode section $V1a_1$ and the voltage thereby applied to the cathode is positive 42 volts. The connection of positive 130 volts to the armature of receive relay $RA_1$ at this time causes the voltage on receive hub $RH_1$ to change from negative 40 volts to positive 40 volts and this spacing voltage of positive 40 volts is impressed through resistor $Ea_1$ on the grid of triode section $V1a_1$, the voltage applied to the grid being about 33 volts positive, assuming $V1a_1$ to have been conducting and $V1b_1$ non-conducting. As a result of this positive voltage of 33 volts on the grid and a positive voltage of 42 volts on the cathode, triode section $V1a_1$ becomes non-conducting. When triode section $V1a_1$ becomes non-conducting, the combination of the spacing voltage of positive 40 volts applied through resistor $Ja_1$ and the positive 130 volts impressed through resistors $La_1$ and resistor $Ka_1$, causes to be impressed on the grid of triode section $V1b_1$ a positive voltage of 97 volts and triode section $V1b_1$ becomes conducting.

With conditioning device CA in the position of triode section $V1a_1$ being non-conducting and triode section $V1b_1$ being conducting, the voltage at the grid of triode section $V2a_1$ is about zero and triode section $V2a_1$ conducts to thereby apply the negative 24 volts permanently impressed on its cathode, directly to the grid of triode section $V2b_1$. This negative 24 volts holds triode section $V2b_1$ in a non-conducting condition. Triode section $V2b_1$ being in a non-conducting condition will block regenerated signals in the output of regenerative repeater $RR_1$ from operating send relay $SA_1$ and the regenerated signals cannot therefore be repeated to the send line. Conditioning device $CA_1$ will remain in this position after receive relay $RA_1$ returns to its marking position even after the incoming message is completed, unless, of course, a signal is received over the repeater of another of the line circuits. Therefore, during the time the receive relay $RA_1$ is operating, conditioning device $CA_1$ will remain constantly in the position which locks triode section $V2b_1$ in a non-conducting condition.

*When the receive relay of another line repeater operates to spacing when receive relay $RA_1$ of repeater $LRA_1$ is normal*

After receive relay $RA_1$ has ceased to operate and has returned to its marking position, a space signal from any one of the other line repeaters will cause the voltage on the receive hub $RH_1$ to become positive 40 volts. This positive voltage of 40 volts is applied through resistor $Ea_1$ on to the grid of triode section $V1a_1$ and is combined with the positive voltage of 20 volts which is applied through resistor $Fa_1$ to produce a voltage on the grid of triode section $V1A_1$ of about positive 33 volts. This positive voltage of 33 volts causes triode section $V1a_1$ to conduct, and therefore triode section $V2a_1$ becomes non-conducting to remove the locking voltage from the grid of triode section $V2b_1$. Triode section $V2b_2$ becomes conducting and allows the signals to go out on the send leg $S1a_1$.

Triode section $V1a_1$ upon becoming conducting at this time causes triode section $V1b_1$ to become non-conducting and conditioning device $CA_1$ will now remain in this position during the time that signals are being received over the receiving hub $RH_1$ from the receive relay of such other line repeater, and also after that time until the receive relay $RA_1$ on line repeater $LRA_1$ once again operates to spacing in response to signals incoming over line $A_1$.

*Double-space by-pass*

When the receive relays of two line repeaters, such as repeaters $LRA_1$ and $LRB_1$, operate to their spacing positions simultaneously the connection of a source of positive 130 volts at the armature of each relay completes parallel paths respectively extending through resistances $Aa_1$ and $Ab_1$ to the receive hub $RH_1$, common to both paths. The two sources of positive 130 volts when combined with the negative voltage of 40 volts at potentiometer P—1 cause a resultant voltage of approximately 70 volts positive on receive hub $RH_1$.

When receive relay $RA_1$ only is receiving incoming signals and is in its spacing position triode section $V1a_1$ of conditioning device $CA_1$ has at its cathode a positive voltage of 42 volts and at its grid a positive voltage of 33 volts which make triode section $V1a_1$ non-conducting. Therefore, with triode section $V1a_1$ non-conducting, triode section $V1b_1$, also of conditioning device $CA_1$, becomes conducting because of the provision for flip-flop operation. When triode $V1b_1$ is conducting, triode sections $V2a_1$ and $V2b_1$ of the send relay driving device $DA_1$ become conducting and non-conducting, respectively, so that no signals pass from the regenerative repeater $RR_1$ to send relay $SA_1$.

When receive relay $RB_1$ operates to spacing at the time receive relay $RA_1$ is in its spacing position, to cause the voltage on receive hub $RH_1$ to become positive 70 volts, the existing cathode voltage of 42 volts and grid voltage of 33 volts which made triode section $V1a_1$ non-conducting as hereinbefore described are respectively increased to positive 49 volts and positive 53 volts to change triode section $V1a_1$ from non-conducting to conducting. Triode section $V1a_1$ of conditioning device $CA_1$, upon becoming conducting at this time, removes the lock from the grid of triode section $V2b_1$ of send relay driving device $DA_1$ and thereby allows the space signal in the output of regenerative repeater $RR_1$ to pass through to the windings of send relay $SA_1$ which operates to transmit a space signal back to the point where the received signal originated. The attendant at the distant end of line $A_1$ upon receiving the space signal is informed by the resulting mutilation of his home copy of his sent message that his message transmission to the hub repeater has been interrupted by an attendant at another distant point, who, in the case herein described, has caused line repeater $LRB_1$ to operate while incoming signals are being received by line repeater $LRA_1$.

*Compensation for producing square-topped forms for mark-to-space transitions of signals outgoing over the send legs of the lines*

Ordinarily the inductive surge which exists across the windings of a send relay in response to each spacing impulse received from the regenerative repeater $RR_1$, would drive the cathode of its associate triode section $V2b_1$ to positive and thereby round off the top of the wave on each mark-to-space transition. This is overcome by the use of a condenser, such as condenser $XA_1$ in line repeater $LRA_1$, in a shunt to ground between the source of plate voltage and the plate of its triode section $V2b_1$, which causes a momentary increase in plate current to compensate for the decrease plate current due to inductive effect of the relay winding causing the cathode of $V2b_1$ to become momentarily positive.

GENERAL DESCRIPTION OF FIG. 2

Figure 2:
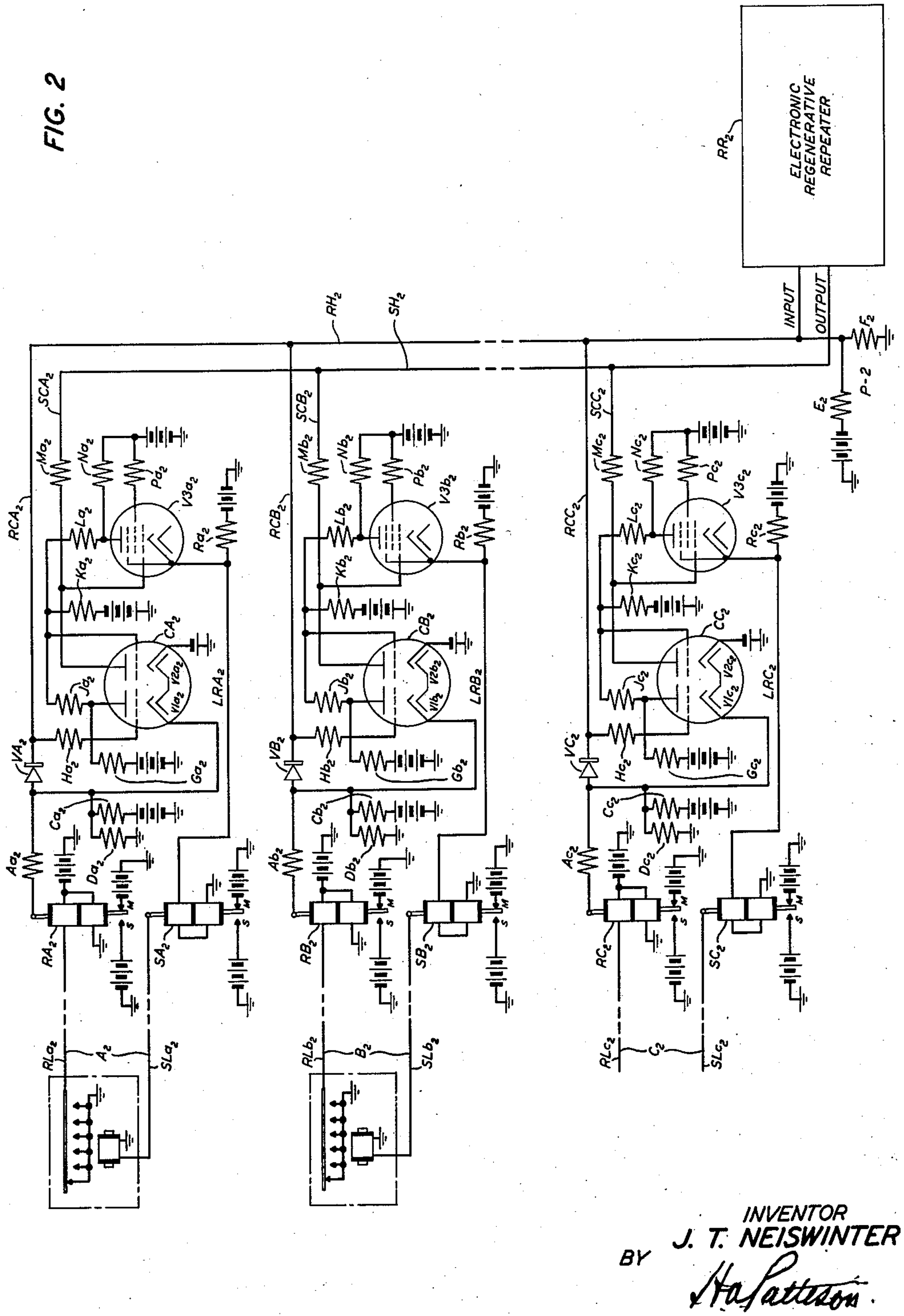

Referring to Fig. 2 the line repeaters are identical, all sources of potential except where otherwise specified, are assumed to be positive 130 volts or negative 130 volts as indicated, and the corresponding elements of the line repeaters are distinguished from each other in the same manner as the corresponding elements of the balanced line repeaters of Fig. 1, that is, by alphabetical suffixes A or *a*, B or *b*, C or *c*, etc., except that the elements in Fig. 1 are indicated by subscript numeral 1 whereas those in Fig. 2 are indicated by subscript numeral 2. The corresponding resistors of the line repeaters in Fig. 2 are also designated with reference characters of identical alphabetical letters A, B and C of the upper case and to each of these is added a letter such as *a*, *b* or *c* of the lower case to indicate the line repeater of which it forms a part. Each of the lower case letters of the resistor reference characters has a subscript numeral 2 to indicate that the resistor is located in Fig. 2.

The resistors in each repeater of Fig. 2 are assumed to have the following resistance values: A equals 6,000 ohms, C equals 3,000 ohms, D equals 3,000 ohms, E equals 17,333 ohms, F equals 7,700 ohms, G equals 0.1 megohm, H equals 0.5 megohm, J equals 0.5 megohm, K equals 0.21 megohm, L equals 0.5 megohm, M equals 0.05 megohm, N equals 0.01 megohm, P equals 0.01 megohm, and R equals 20,000 ohms.

Line $A_2$ is connected to repeater $LRA_2$, line $B_2$ is connected to repeater $LRB_2$ and line $C_2$ is connected to repeater $LRC_2$. The line repeaters are connected in parallel to common receive hub $RH_2$ and then over common receive hub $RH_2$ to regenerative repeater $RR_2$ and potentiometer P—2, in parallel. The potentiometer P—2 comprises resistors $E_2$ and $F_2$ of resistance values 17,333 ohms and 7,700 ohms, respectively, and furnishes at its point of connection to receive hub $RH_2$ a negative potential of 40 volts.

Each of the line repeaters has in its control circuit a twin triode and a pentode. For example, in line repeater $LRA_2$ are triode sections $V1a_2$ and $V2a_2$ and pentode $V3a$; in line repeater $LRB_2$ are triode sections $V1b_2$ and $V2b_2$ and pentode $V3b$; and in line repeater $LRC_2$ are triode sections $V1c_2$ and $V2c_2$ and pentode $V3c$.

Line repeater $LRA_2$ will be described with respect to its component parts and such description should suffice for the other line repeaters connected in the system which may include, in addition to line repeaters $LRB_2$ and $LRC_2$, other line repeaters, not shown. Line repeater $LRA_2$ comprises receive relay $RA_2$, send relay $SA_2$, receive conductor $RCA_2$, send conductor $SCA_2$ and its control circuit with twin triode $CA_2$ for conditioning the repeater, pentode $V3a$ for driving the send relay $SA_2$, rectifying varistor $VA_2$, and the associated resistors $Aa_2$, $Ca_2$, $Da_2$, $Ga_2$, $Ha_2$, $Ja_2$, $Ka_2$, $La_2$, $Ma_2$, $Na_2$, $Pa_2$ and $Ra_2$. Inasmuch as the other line repeaters are identical with line repeater $LRA_2$, the corresponding parts of such other line repeaters are designated by reference characters identifying the repeater in which they are located.

Receive conductor $RCA_2$ is included in a circuit comprising the armature of relay $RA_2$ which armature is in engageable relation with alternate current sources of positive 130 volts and negative 130 volts, respectively, resistor $Aa_2$, rectifying varistor $VA_2$, receive hub $RH_2$ and two parallel paths, one extending to the connecting point of potentiometer P—2 whereat is furnished the negative 40 volts as hereinbefore mentioned, and the other extending to the input of regenerative repeater $RR_2$, the receive hub $RH_2$ and the parallel paths being common to all the line repeaters. The rectifying varistor $VA_2$ permits the flow of current in a spacing direction only, that is, a current flowing from positive 130 volts at the armature and spacing, or left-hand, contact of receive relay $RA_2$ to negative 40 volts at potentiometer P—2 whereby the voltage on the receive hub $RH_2$ in response to the operation of relay $RA_2$ to its spacing contact becomes positive 40 volts. The rectifying varistor $VA_2$ isolates the negative source of 130 volts connected to the armature at marking, or right-hand, contact of relay $RA_2$ from receive hub $RH_2$. Thus the marking and spacing voltages impressed on the receive hub $RH_2$ in response to the operation of relay $RA_2$ to its marking and spacing positions are negative 40 volts and positive 40 volts, respectively.

A double-space by-pass feature is provided as will be hereinafter described in detail, for indicating when two receiving relay armatures operate to their respective spacing contacts simultaneously. In such case two sources of positive 130 volts are connected through two 6,000-ohm resistors, effectively in parallel, to receive hub $RH_2$ and cause when combined with the negative 40 volts at potentiometer P—2 a positive voltage of approximately 70 volts on the receive hub. The difference between the positive 70 volts and the positive 40 volts which results on the receive hub when only one receive relay armature operates to its spacing contact is used to prevent a locking condition in the control circuits of the line repeaters that are receiving signals incoming over their respective lines. Ordinarily the control circuit of the repeater which is receiving signals incoming over its line is locked during the reception of the signals, to prevent such incoming signals, after regeneration, from being repeated back over the same line.

The regenerative repeater $RR_2$ is shown in box form and may be either of the electromagnetic relay type disclosed in Patent 2,154,608 granted to A. D. Dowd on April 18, 1939 or of either of the electronic types such as disclosed in the patent application of B. Ostendorf, Serial No. 77,169 filed February 18, 1949, W. T. Rea et al. Patent 2,454,084 issued November 16, 1948. The disclosures of the copending application and the two patents are hereby made a part of the present application to the same extent as if set forth herein in full. The input of the repeater $RR_2$ is connected to the receive hub $RH_2$ and receives the marking and spacing voltages produced in the receive hub $RH_2$ in response to the signal impulses incoming over the lines. The input marking and spacing impulses are regenerated for transmission to the output. The output marking and spacing impulses of repeater $RR_2$ are transmitted as regenerated impulses of negative 40 volts and positive 40 volts to send hub $SH_2$. Ordinarily the marking and spacing impulses on send hub $SH_2$ are transmitted to those lines other than the one over which the signals, before regeneration, were received.

DETAILED DESCRIPTION OF FIG. 2

*Receive relays of all line repeaters are in their respective marking positions*

With the receive relay of each line repeater in its marking position a source of negative voltage of 130 volts is connected to one end of the receive conductor of each of the line repeaters. The receive conductors of the line repeaters are connected in parallel to receive hub $RH_2$ which is connected at its other end to other parallel paths, one extending to potentiometer P—2 and the other to the input of regenerative repeater $RR_2$, the voltage furnished at the point of connection of potentiometer P—2 being negative 40 volts. Included in each of the receive conductors is a resistor having a resistance value of 6,000 ohms and a rectifying varistor which isolates the negative 130 volts at the armature of its respectively associated receive relay in its marking position, from receive hub $RH_2$ and thereby prevents current from flowing in a marking direction, but permits current to flow in its spacing direction when the armature of the receive relay operates to its spacing position inasmuch as a positive voltage of 130 volts is connected to the receive conductor.

The condition wherein the receive relays of all the line repeaters are in their marking positions will be described in connection with line repeater $LRA_2$ because inasmuch as the line repeaters are identical a description of one should suffice for that of the others.

The negative 40 volts on receive hub $RH_2$ when receive relay $RA_2$ of line repeater $LRA_2$ is in its marking position, is applied to the grid of triode section $V1a_2$, through resistor $Ha_2$, and thereby makes triode section $V1a_2$ non-conducting. The negative 40 volts in the output of the regenerative repeater $RR_2$ is applied over send hub $SH_2$ through resistor $Ma_2$ to the grid of pentode $V3a$ to make the pentode $V3a$ non-conducting.

With pentode $V3a$ in a non-conducting condition, the positive 130 volts of the grounded battery connected to the plate of pentode $V3a$, through resistor $Na_2$, is applied through resistor $La_2$ to the grid of triode section $V2a_2$. Also, with triode section $V1a_2$ in a non-conducting condition, the positive 130 volts is impressed on the grid of triode section $V2a_2$ through resistors $Ga_2$ and $Ja_2$. The positive 130 volts applied to the grid of triode section $V2a_2$ from the plate of each of triode section $V1a_2$ and pentode $V3a$ combines with the negative 130 volts of the grounded battery also connected through resistor $Ka_2$ to the grid of triode section $V2a_2$ to produce a voltage of negative 15 volts. The negative 15 volts on the grid of triode section $V2a_2$ and the negative 24 volts at the cathode of triode section $V2a_2$ would under certain conditions cause triode section $V2a_2$ to be biased to positive polarity and the triode section would be conducting were it not for the fact that the plate of the triode section being connected to send hub $SH_2$ which is normally at a negative voltage of 40 volts, is at this time more negative than its associated cathode. Because of this negative voltage of 40 volts on send hub $SH_2$ triode section $V2a_2$ does not conduct at this time.

Therefore, under the condition wherein the receive relays of all the line repeaters are in their marking positions triode sections $V1a_2$ and $V2a_2$ and pentode $V3a$ are non-conducting.

*Receive relay of one only of the line repeaters operates to its spacing position*

Should it be assumed that receive relay $RA_2$ operates to its spacing position in response to the start impulse of the first signal incoming over line $A_2$, the relay would connect positive 130 volts to receive conductor $RCA_2$ which would cause current to flow through resistor $Aa_2$, rectifying varistor $VA_2$, receive hub $RH_2$, to the input of regenerative repeater $RR_2$. The resistance of receive conductor $RCA_2$, receive hub $RH_2$ and potentiometer P—2 is arranged so that the combination of positive 130 volts from receive conductor $RCA_2$, and the negative 40 volts at the potentiometer produces a voltage of positive 40 volts on receive hub circuit $RH_2$.

With the negative 15 volts on the grid of triode section $V2a_2$ and the negative 24 volts of the grounded battery connected to the cathode of triode section $V2a_2$, a positive bias, as hereinbefore stated, exists across the grid and cathode of triode section $V2a_2$, and inasmuch as a positive 40 volts now exists on send hub $SH_2$ and therefore on the plate of triode section $V2a_2$, current will flow from the plate to the cathode whereby triode section $V2a_2$ is changed from non-conducting to conducting condition. When triode section $V2a_2$ becomes conducting, it will connect the negative 24 volts at its cathode to the grid of pentode $V3a$ and inasmuch as the only impedance is that of the plate to the cathode of triode section $V2a_2$, the negative 24 volts will bias the grid of pentode $V3a$ negatively with respect to the cathode thereof and pentode $V3a$ is therefore held non-conducting even when the sending hub $SH_2$ goes to positive 40 volts when receive relay $RA_2$ operates to its spacing position in response to a spacing impulse incoming over line $A_2$. In this manner the negative 24 volts on the cathode of triode section $V2a_2$ when in a conducting condition, provides the "holding" feature for pentode $V3a$ when signals are incoming over line $A_2$ whereby said incoming signals cannot be repeated by send relay $SA_2$ over line $A_2$ to the point where they originated.

*When the receive relay of another line repeater operates to spacing when receive relay $RA_2$ of repeater $LRA_2$ is normal*

Should it be assumed that receive relay $RA_2$ of repeater $LRA_2$ is in its marking position, that is, normal, when a space signal is received over another line, say line $B_2$, and receive relay $RB_2$ thereof is momentarily operated to its spacing position in response to a space signal incoming over line $B_2$, the voltage on the receive hub $RH_2$ would change from negative 40 volts to positive 40 volts. This positive 40 volts would be applied to all the receive conductors such as conductors $RCA_2$, $RCB_2$, $RCC_2$, etc. With respect to receive conductor $RCA_2$ the positive 40 volts is impressed through resistor $Ha_2$ onto the grid of triode section $V1a_2$ to change triode section $V1a_2$ from a non-conducting to a conducting condition. Triode section $V1a_2$, upon becoming conducting, has at its plate a voltage of low value and the decrease of this voltage at the plate of triode section $V1a_2$ reduces the effective voltage applied to the grid of triode section $V2a_2$ to about 35 volts negative and triode section $V2a_2$ thereby remains non-conducting. Triode section $V2a_2$, in its non-conducting condition, does not apply the negative 24 volts of the grounded battery connected to its cathode, to the grid of pentode $V3a$ and therefore pentode $V3a$ is prepared to become conducting.

When the space impulse repeated by receive relay $RB_2$ has been regenerated by regenerative repeater $RR_2$ and the regenerated impulse is transmitted over the output of repeater $RR_2$ to the send hub $SH_2$, this regenerated impulse of positive 40 volts is impressed on the grid of pentode $V3a$ to make the pentode conducting. Pentode $V3a$ upon becoming conducting, causes a spacing current of 12 milliamperes to flow through the windings, in series, of send relay $SA_2$ and this current of 12 milliamperes flowing in a spacing direction dominates the 6 milliamperes current normally flowing in a marking direction from the current source connected to resistor $Ra_2$. The dominating current operates the send relay $SA_2$ to its spacing position whereby a spacing impulse, regenerated, is transmitted over line $A_2$.

In like manner a regenerated spacing impulse is transmitted by send relay $SC_2$ to line $C_2$ and by each of the corresponding send relays in each of the other lines, except line $B_2$ over which the incoming signal impulse was received.

At the end of the spacing signal impulse on the receive hub, the voltage on the grid triode section $V1a_2$ becomes negative causing triode section $V1a_2$ to be non-conducting and the voltage at the plate of triode section $V1a_2$ becomes positive 130 volts. The voltage at the grid of triode section $V2a_2$ at this time remains negative, however, because pentode $V3a$ is still conducting, and continues to conduct until the transmission of the spacing signal impulse from the regenerative repeater is completed. While pentode $V3a$ is conducting the negative effect from pentode $V3a$ on the grid of triode section $V2a_2$ will hold triode section $V2a_2$ non-conducting.

*Double-space by-pass*

In double-space operation two or more line repeaters simultaneously receive spacing impulses from their respective lines whereby correct transmission through the hub repeater is interferred with. For illustration purposes it is assumed herein that spacing impulses are simultaneously received by line repeaters $LRA_2$ and $LRB_2$ from their respective lines $A_2$ and $B_2$.

When the receive relay $RA_2$ is operated to its spacing position in response to a spacing signal impulse incoming over receive leg $RLa_2$, positive 130 volts is connected to its armature and impressed on one end of receive conductor $RCA_2$ while negative 40 volts from potentiometer P—2 is impressed on the other end; a resultant voltage of positive 40 volts on receive hub $RH_2$ is impressed through resistor $Ha_2$, on the grid of triode section $V1a_2$. At the same time the voltage in the cathode of triode section $V1a_2$ becomes positive 55 volts. As hereinbefore stated, under these conditions triode section $V1a_2$ does not become conducting.

If, while receive relay $RA_2$ is in its spacing position and positive 40 volts is accordingly applied to receive hub $RA_2$, a receive relay of another line repeater such as relay $Rb_2$ of line repeater $LRB_2$, operates to its spacing position also, a positive voltage of 70 volts is impressed on receive hub $RH_2$ resulting from the two voltages of positive 130 volts on the respective ends of the receive conductors $RCA_2$ and $RCB_2$ connected in effective parallel relation to receive hub $RH_2$ and the negative 40 volts from potentiometer P—2 at the other end of receive hub $RH_2$. This positive voltage of 70 volts is applied through resistor $Ha_2$ to the grid of triode section $V1a_2$. At the same time the voltage impressed on the cathode of triode section $V1a_2$ also becomes positive 70 volts.

Triode section $V1a_2$ now having positive 70 volts impressed on both its grid and its cathode, becomes conducting. With triode section $V1a_2$ conducting, triode section $V2a_2$ having no change in the voltage applied to its grid at this time, remains non-conducting. Inasmuch as triode section $V2a_2$ is not conducting the holding voltage of negative 24 volts is not applied to the grid of pentode $V3a$ and the full positive 40 volts spacing impulse in the output of regenerative repeater $RR_2$ is applied to the grid of pentode $V3a$, and pentode $V3a$ becomes conducting in response to the space impulse on the receive hub $RH_2$ and the space impulse is thereby transmitted by send relay $SA_2$ to send leg $SLa_2$ of line $A_2$.

Therefore, when two space signal impulses are received simultaneously over the receive legs of two lines the triode sections, corresponding to triode section $V1a_2$ of line repeater $LRA_2$, of all the repeaters will become conducting and a regenerated space impulse having a voltage of 40 volts positive is transmitted from regenerative repeater $RR_2$ to the send relays of all the line repeaters connected to the send hub $SH_2$. The space signal impulse transmitted on the line from which signals are being received will mutilate the home copy of the sent signals. This mutilation of the home copy at the transmitting station will serve to inform the transmitting attendant that interference is encountered at the repeater station and that the transmitted message is not being correctly transmitted to the other lines.

*Compensation for producing square-topped forms for mark-to-space transitions of signals outgoing over the send legs of the lines*

Ordinarily, the inductive surge which exists across the windings of a send relay in response to each spacing impulse received from the regenerative repeater $RR_2$, would drive the cathode of its associated pentode to positive and thereby round off the top of the wave on each mark-to-space transition. This is overcome by the fact that a full positive 40 volts on send hub $SH_2$ is applied to the grid of pentode, such as pentode $V3a$, at the time when the negative 24 volts is removed from the grid of the pentode whereby no bridging resistance exists, plus the high resistance furnished by the biasing voltage on both the plate and screen grid of the pentode.

FIGURES 1 AND 2

The circuit constants and component values recited herein are for illustrative purposes only and may be varied, as desired, to produce results that are within the scope of the invention.

What is claimed is:

1. A telegraph signal repeater system comprising a plurality of telegraph lines terminating at a common station, each having connected thereto at said terminating station receiving repeating means and sending repeating means, other repeating means responsive to any one of said receiving repeating means for simultaneously operating all said sending repeating means other than that respectively associated with said one receiving repeating means, an electron discharge device responsive to signals from each of said receiving repeating means, a second electronic discharge device, a cathode circuit included in said second device arranged to cooperate with said other repeating means to operate its respectively associated sending repeating means when said second device is in a conducting condition and a grid included in said second device responsive to the operation of said first-mentioned device for preventing a current flow in said cathode circuit when its respectively associated first-mentioned device is responding to signals from its receiving repeating means whereby its respectively associated sending repeating means is unable to receive signals from said other repeating means.

2. A telegraph signal repeater system comprising a plurality of telegraph lines terminating at a common station, a repeater at said common station connected to each of said lines, receiving repeating means and sending repeating means in each of said repeaters, an electronic discharge device responsive to signals from each of said receiving repeating means, a second electronic discharge device controlled by the first-mentioned device for controlling the operation of said sending repeating means, and means connected to said receiving repeating means and cooperating with said electronic discharge devices for operating said common repeater on a one-way polar basis in response to signals incoming over its respective telegraph line.

3. A telegraph signal repeater system comprising a plurality of telegraph lines terminating at a common station, a repeater at said common station connected to each of said lines, receiving repeating means and sending repeating means in each of said repeaters, an electronic discharge device responsive to signals from each of said receiving repeating means, a second electronic discharge device controlled by the first-mentioned device for controlling the operation of said sending repeating means, and a unilateral electrical conducting device connected to each of said receiving repeating means for operating said repeater on a one-way polar basis.

4. A telegraph signal repeater system comprising a plurality of telegraph lines terminating at a common station, a repeater at said common station connected to each of said lines, receiving repeating means and sending repeating means in each of said repeaters, an electronic discharge device responsive to signals from each of said receiving repeating means, a second electronic discharge device controlled by the first-mentioned device for controlling the operation of said sending repeating means, and means connected to said second electronic discharge device for utilizing the cathode current in said second electronic discharge device for operating said sending repeating means to repeat signals over each of said lines.

5. A telegraph signal repeater system comprising a plurality of telegraph lines terminating at a common station, a repeater at said common station connected to each of said lines, receiving repeating means and sending repeating means in each of said repeaters, a twin-triode electronic discharge device responsive to signals from each of said receiving repeating means, a second twin-triode electronic discharge device controlled by the first-mentioned device for controlling the operation of said sending repeating means, and means connected in the plate circuit of one of the triode sections of said second twin-triode device for storing a potential during the non-conducting intervals of said one triode section whereby any reactive effect of current flowing in the plate circuit of said triode section during a conducting interval, on said sending repeating means, is eliminated from the output of said sending repeating means.

6. A telegraph signal repeater system arranged for hub operation and comprising a plurality of telegraph lines terminating at a common station, a repeater at said common station connected to each of said lines, receiving repeating means and sending repeating means in each of said line repeaters, an electronic discharge device responsive to signals from each of said receiving repeating means, a second electronic discharge device connected to the first-mentioned device, a repeater common to all said line repeaters, a receive hub circuit through which all said receiving repeating means are connected in parallel to said common repeater, a send hub circuit connecting said common repeater through each of said second devices to the sending repeating means respectfully connected thereto, means in said second device responsive to varying conditions in the first-mentioned device for holding said second device in a non-conducting condition at all times except when signals are being received from the receiving repeating means of any one or more of the other of said repeaters connected in the system for hub operation, and other means responsive to the signal output of said common repeater during the conducting intervals of said second device for operating said sending repeating means.

7. A telegraph signal repeater system arranged for hub operation and comprising a plurality of telegraph lines terminating at a common station, a repeater at said common station connected to each of said lines, receiving repeating means and sending repeating means in each of said line repeaters, an electronic discharge device responsive to signals from each of said receiving repeating means, a second electronic discharge device controlled by the first device for controlling the operation of said sending repeating means, a receive hub circuit to which all said receiving repeating means are connected in parallel, a send hub circuit connected in common through each of said second devices to the sending repeating means connected thereto, common repeater means interconnecting said receive hub circuit and said send hub circuit, and a circuit and a source of potential therefor connected in parallel to a cathode circuit of said second electronic device for normally holding the send repeating means non-responsive when said second electronic device is non-responsive to signals from said common repeater means.

8. A telegraph signal repeater system arranged for hub operation and comprising a plurality of telegraph lines terminating at a common station, a repeater at said common station connected to each of said lines, receiving repeating means and sending repeating means in each of said line repeaters, an electronic discharge device having two triode sections, potential supply means controlled by said receiving repeating means for changing one of said triode sections from a conducting to a non-conducting condition or vice versa, and other potential supply means controlled by said one triode section for automatcially changing the other of said triode sections to the condition opposite to that of said one triode section, means for respectively maintaining said triode sections conducting and non-conducting or vice versa during the idle intervals when no signals are being received from the receiving repeating means of any one or more of said line repeaters, and other means responsive to signals received from said receiving repeating means for maintaining the triode sections in opposite condition for the duration of the reception of said received signals unless a signal is received from another of said receiving repeating means, and a second electronic discharge device controlled by said other triode section for controlling the operation of the first-mentioned sending repeating means.

9. In a telegraph signal repeater system, a plurality of telegraph lines terminating at a common station, a repeater at said common station connected to each of said lines, receiving repeating means and sending repeating means in each of said line repeaters, a repeater connected in common to the receiving repeating means and the sending repeating means of each of said line repeaters, each of said line repeaters comprising an electronic discharge device having two triode sections arranged for flip-flop operation, said device being responsive to signals from its receiving repeating means, a second electronic discharge device having two triode sections arranged to automatically assume a conducting and a non-conducting condition, respectively, or a non-conducting and a conducting condition, respectively, under the control of said first-mentioned device, means for applying the signals repeated by said common repeater to one of the triode sections of each of said second devices whereby the repeatered signals from said common repeater are prevented from being transmitted to the sending repeating means of the line repeater over which the original signals were received and are simultaneously transmitted to the sending repeating means of each of the other of said line repeaters.

10. In a telegraph signal repeater system in accordance with claim 9 wherein one of the triode sections of said first-mentioned electronic device has means effective when said one triode section of said first-mentioned device is in a conducting condition for holding the other triode section of said second-mentioned device in a non-conducting condition when signals are being received from the receiving repeating means of any one of the other of said line repeaters.

11. A telegraph signal repeater system, a plurality of telegraph lines terminating at a common station, a repeater at said common station connected to each of said lines, receiving repeating means and sending repeating means in each of said line repeaters, a repeater connected in common to the receiving repeating means and the sending repeating means of each of said line repeaters, each of said line repeaters (1) comprising an electronic discharge device having two triode sections and (2) responsive to signals incoming from its receiving repeating means, a second electronic discharge device controlled by the first-mentioned device and responsive to repeatered signals from said common repeater, means controlled by one of the triodes of the first-mentioned device for holding the second electronic device ineffective to transmit the repeatered signals to its sending repeating means when said repeatered signals were originally received from the receiving repeating means of its own line repeater, and other means controlled by the repeatered signals from said common repeater when said repeatered signals are received from the receiving repeating means of another of said line repeaters during the time that said second device is ineffective, for making said second device effective to transmit the repeatered signals to its sending repeating means.

12. A telegraph signal repeater system comprising a plurality of telegraph lines terminating in a common station, each having at said terminating station receiving repeating means and sending repeating means, a common receiving circuit associated with all of said receiving repeating means, a common sending circuit associated with all of said sending repeating means, means for transferring signals from said common receiving circuit to said common sending circuit, an electron discharge tube associated with each of said sending repeating means and controlled by said signal transferring means for operating its sending repeating means, and electron discharge tube associated with each of said receiving repeating means and arranged to operate only upon response of said common receiving circuit to signals received over any other of said lines other than that with which said last-mentioned discharge tube is associated, and means comprising an electron discharge tube controllable jointly by the second-mentioned tube and said common sending circuit and operable by signals on said common sending circuit when said second-mentioned tube is unoperated for estopping operation of said first-mentioned tube.

JAMES TRAPP NEISWINTER.

No references cited.